United States Patent [19]

van Roostselaar

[11] Patent Number: 5,440,076
[45] Date of Patent: Aug. 8, 1995

[54] WEIGHT-CHECKING APPARATUS

[75] Inventor: Jan van Roostselaar, Scherpenzeel, Netherlands

[73] Assignee: Eerste Nederlandse Fabriek van Weegwerktuigen Jan Molenschot BV, Netherlands

[21] Appl. No.: 910,334
[22] PCT Filed: Oct. 18, 1991
[86] PCT No.: PCT/EP90/01983
§ 371 Date: Jan. 6, 1993
§ 102(e) Date: Jan. 6, 1993
[87] PCT Pub. No.: WO92/08960
PCT Pub. Date: May 29, 1992
[51] Int. Cl.$^6$ .............................................. G01G 19/52
[52] U.S. Cl. ....................................................... 177/50
[58] Field of Search ........................................... 177/50

[56] References Cited

U.S. PATENT DOCUMENTS

| 3,828,869 | 8/1974 | Sellers . | |
|---|---|---|---|
| 4,499,961 | 2/1985 | Fukuda | 177/25.18 |
| 4,515,231 | 5/1985 | Ishida | 177/50 X |
| 4,582,454 | 4/1986 | Brandenburg et al. | 177/50 X |

FOREIGN PATENT DOCUMENTS

| 7413191 | 4/1976 | Netherlands . |
| 1030620 | 5/1966 | United Kingdom . |

Primary Examiner—Benjamin R. Fuller
Assistant Examiner—Randy W. Gibson
Attorney, Agent, or Firm—Andrus, Sceales, Starke & Sawall

[57] ABSTRACT

The invention relates to an apparatus for automatically weighing a bulk product of particle-like material such as grain for example with a set weight, provided with a weighing bunker, automatic supply and discharge means for feeding the particle-like material to and from the bunker respectively, weighing means for the weighing bunker provided with a number of electromechanical load cells on a number of suspension points for detecting the weight of the weighing bunker and for giving an electrical signal which is proportional to the force exercised on the load cell and which signal is used for controlling the supply and discharge means, and in which weight-checking means are present for checking the correctness of the measured values given by the load cells (17) for the final determination of the total weight of the weighing bunker. A particular characteristic of the invention is that the check-weighing means are secondary electromechanical load cells (19) the electric signal from which is compared by a comparator (30) with that from the primary electromechanical load cells (17) and the resulting signl is used for controlling (32) the supply and the discharge means. Preferably, a series of combined units (1) of primary and secondary electromechanical load cells (17, 19) are mechanically and serially mounted at a suspension point in such a manner that the secondary detector (19) of a unit (1) is subjected to the same weight-loading P as the concerned primary load cell (17) and checks the signal therefrom. Suitable for their purpose, the combined units (1) comprise a vertical frame of U-form (15) which the primary load cell (17) is affixed to the upper leg (16) and the secondary load cell (19) to the lower leg (18) of the frame (15) of U-form whilst the outer side of the frame (15) of U-form is closed by a dismountable vertical connecting rod (20).

11 Claims, 2 Drawing Sheets

WEIGHT-CHECKING APPARATUS

The invention relates to an automatic weighing apparatus for weighing a bulk product of particle-like material such as grain for example, by dividing it into discrete loads (so-called batches), determining the mass of each discrete load in sequence, summing the weighing results and delivering the discrete loads to bulk.

The apparatus is provided with a weigh hopper, means of automatic supply and discharge of the particle-like material to and from the weigh hopper respectively, means for weighing the weigh hopper consisting of a number of electro-mechanical loadcells at a number of suspension points for sensing the weight of the weigh hopper and for giving an electric signal which is proportional to the force excerted on the loadcells concerned and which is used for controlling the means of supply and discharge, and in which the means for checking the correctness of the measured weight values given by the loadcells are present to enable a final and correct determination of the total weight of the weigh hopper.

An apparatus of this type is known from NL-A-7413191. Alongside the obligation to check automatic weighing machines (equal batch weighers and gross-/tare weighers) at regular intervals by means of certified test weights, it is also necessary in the world grain market to have a checking facility incorporated in the automatic weighing apparatus to enable monitoring the indicated weight during operation. ("dynamic check")

In the interest of the world grain trade the automatic weighing equipment in accordance with NL-A-7413191 is therefore fitted with a so-called "check scale".

This check scale consists of a pro-weight platform (with a ratio of e.g. 10 to 1 or 100 to 1) or a graduated weigh beam (with sliding poise) which can be coupled via a change-over device to the lever system of the weigh hopper.

By stopping during operation with a full or an empty weigh hopper, the contents of the weigh hopper can be determined by means of placing proportional weights on the pro-weight platform or by means of positioning the sliding poise on the weigh beam until equilibrium is achieved.

The result can be compared with the weight as indicated on the dial or another form of weight indicator.

A weighing apparatus with such a check scale has a number of objections;

1. The conventional lever system comprises of many moving parts which are subject to wear and tear and the possibility of breakdowns.
2. The check scale checks only part of the weighing system. Thus not all errors in the transmissions are detected.
3. An accurate check weighing wastes operational time and is required to be carried out at the weighing machine itself. A "remote control" is not possible.
4. The weighing process is held up by the check weighings. This can be disadvantageous for both the supply and discharge routes should these checks take too much time.
5. Check weighings are carried out a few times per shift only.
6. The results of the check weighings can not be recorded automatically.
7. No possibility exists to determine wether the check weighings have been carried out "correctly".

The object of the invention is to overcome these objections and to provide a weighing apparatus in which the check weighing function can also be automated fully electronically.

This object is achieved by this invention inasmuch that the means of weighing the weigh hopper and of controlling the supply and discharge devices consist of among others the signal of primary electro-mechanical loadcells and that the means of check weighing consists of secondary electro-mechanical loadcells of which the electrical signal is compared with that of the primary electro-mechanical loadcells.

Through the use of this invention a fully electronically automated process of weighing and check weighing is achieved. Furthermore, by using loadcells, a fast reaction and setting time is obtained through the arrangement of the loadcells and their minimal deformation.

According to a preferred embodiment of the invention a number of combined units of primary and secondary loadcells are fitted in series mechanically at each suspension point in such a manner, that the secondary loadcell is subjected to the same load (less a constant weight of certain components) as the primary loadcell of the same unit and the signal therefrom is checked.

This method effects a great simplification of the check weighing and its electronic processing.

Furthermore according to another favoured embodiment of the invention, the combined units comprise of a U-shaped frame arranged horizontally so that the primary loadcell and the secondary loadcell are affixed to the upper and lower legs respectively of the U-shaped frame. A great degree of accuracy of the measurement will be achieved in this way.

Alongside this, the check weighing is effected automatically, thus without the intervention of the operator, for each gross- or tare weight recording of a batch.

Finally, the check weighing does not take up time, since it is carried out during the equilibrium detection.

The invention is now to be described further with reference to the accompanying drawings showing several examplary embodiments of the invention.

FIG. 1 shows a perspective view of a combined measuring and checking unit.

FIG. 1A shownsa reduced scale diagram of the principles of employment of the unit shown in FIG. 1.

Figure 1:
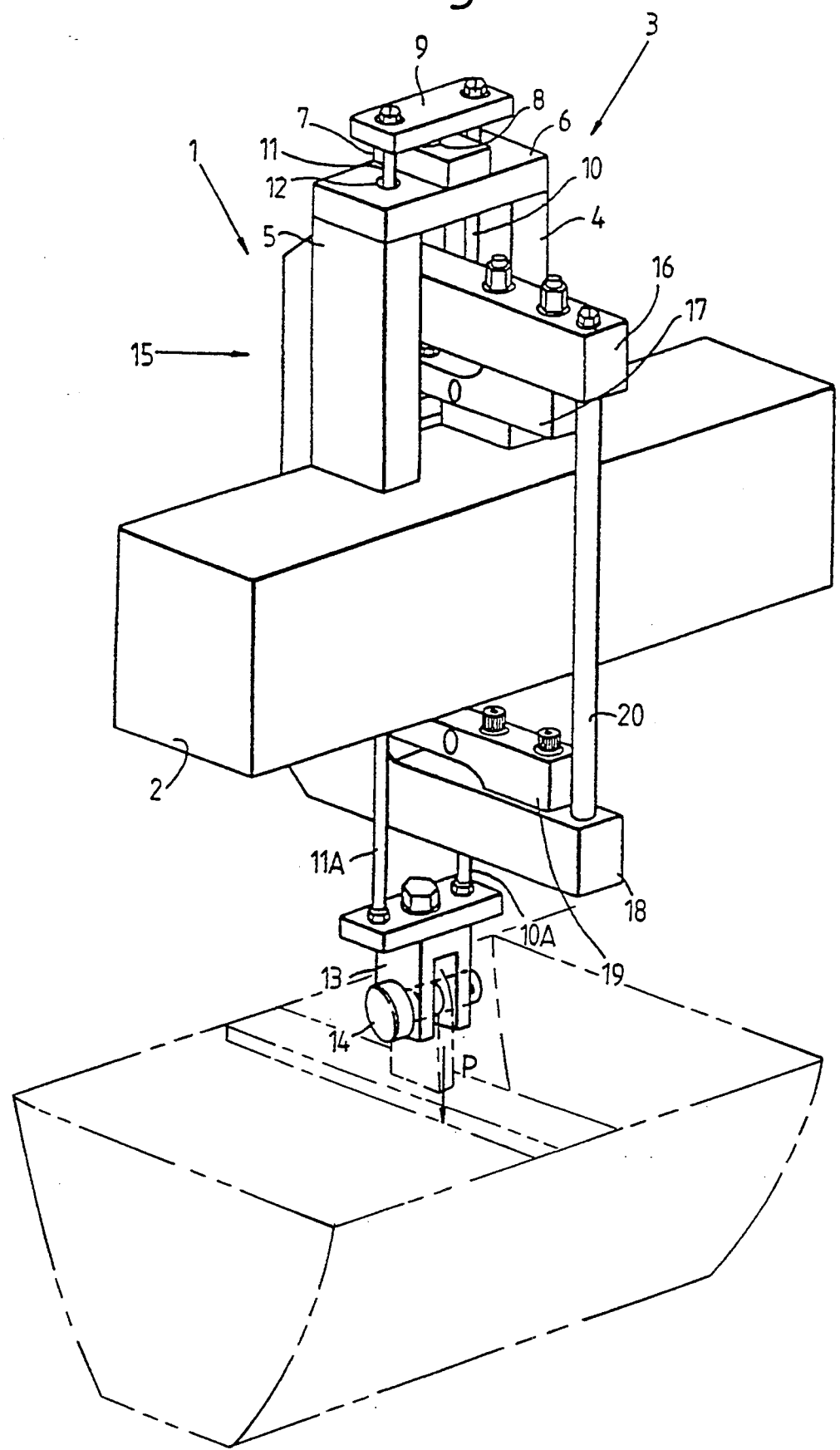
FIG. 1 shows in perspective, a unit which is generally indicated by the reference numeral 1 and is affixed to a fixedly installed beam 2 only a part of which is shown.

The beam 2 forms part of a fixedly installed frame (not shown). A weigh hopper for weighing discrete loads (batches) of particle-like material e.g. grain is arranged for vertical movement with respect to the fixed frame and is attached to cross pin 14.

A yoke generally indicated by reference numeral 3 is placed on the beam 2. This yoke 3 comprises the vertical side plates 4 and 5 to which the horizontal connecting plate 6 is affixed.

A carrier plate 7 is fitted to the horizontal connecting plate 6 for a ball socket 8 of a ball/socket support the ball of which (not shown) is affixed to the underside of the cross plate 9. Two vertically arranged tie rods 10 and 11 are affixed on each side of the cross plate 9 and also extend through the holes 12 (only one of which is shown) and through the horizontal connecting plate 6. These tie rods are at the lower end fixedly connected by a cross connection (not shown) to the upper electro-mechanical loadcell 17.

At the lower side other tie rods 10A and 11A respectively are connected to a support yoke 13 into which the force P to be measured is excerted via cross pin 14.

The upper ends of the tie rods 10A and 11A respectively act on the lower loadcell 19 via a (not shown) cross connection.

A U-shaped frame, generally indicated by reference numeral 15 is arranged between the vertical side plates 4 and 5 of the yoke 3.

A first electro-mechanical loadcell 17 is affixed to the underside of the upper horizontal leg 16 of the frame 15 by means such as bolts and nuts.

A second electro-mechanical loadcell 19 is affixed to the lower horizontal leg 18 of the frame 15 by means such as bolts and nuts. These electro-mechanical loadcells are of a known type and form no part of the invention, thus will not be described further herein.

The outer side of the U-shaped frame 15 is closed off by a detachable vertically arranged connection rod 20.

Figure 1A:
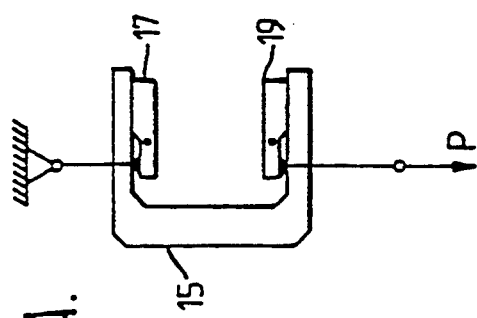

As will be seen in the schematic diagram FIG. 1A, both electro-mechanical loadcells 17 and 19 are serially loaded by the weight P to be measured.

In this arrangement, the primary loadcell is formed by the loadcell 17 and the secondary loadcell is formed by loadcell 19, each of which gives its own signal.

No connecting conductors to the loadcells are shown in FIG. 1 and 1A.

Figure 2:
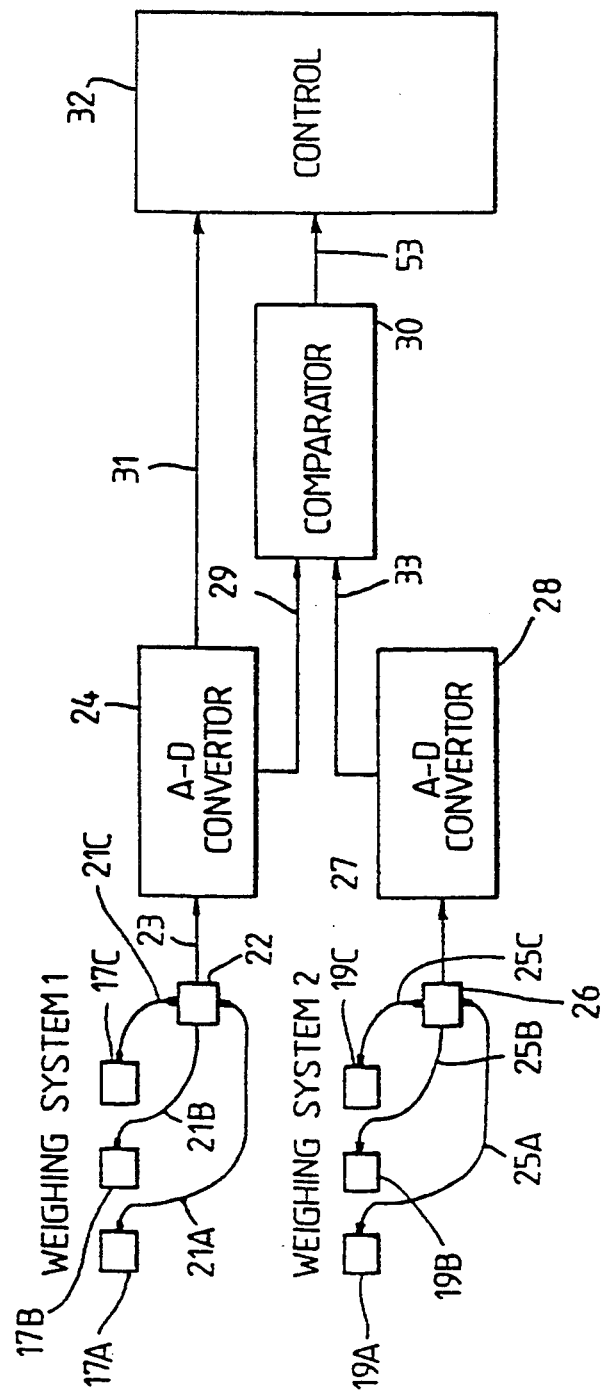
FIG. 2 shows a block diagram of the principles of the electronic processing of the measuring data obtained by a number of units according to FIG. 1.

FIG. 2 is a schematic diagram of the electric circuitry. The primary loadcells 17A, 17B and 17C are each connected by a conductor 21A, 21B and 21C respectively to the junction box 22 which in turn is connected to the Master Analogue/Digital converter 24 by conductor 23.

The secondary loadcells 19A, 19B and 19C are each connected by a conductor 25A, 25B, and 25C respectively to junction box 26 which in turn is connected to the Slave Analogue/Digital converter 28. On one side the Analogue/Digital converter 24 is coupled to a comparator 30 by means of conductor 29 whilst on the other side it is coupled to the check unit 32 by means of a conductor 31.

The Analogue/Digital converter 28 is coupled to the comparator 30 by means of conductor 33 which in turn is connected to the control unit 32.

The analogue weight signal originating from the loadcells 17 and 19 of the primary and secondary weighing system are first conducted to the Master Analogue/Digital converter 24 and the Slave Analogue/Digital converter 28 respectively. Thereafter the digital signals originating from these converters are compared with each other by the comparator 30.

If the difference lies outside of the permitted tolerances then the weighing process is interrupted by the control unit 32; after correction the weighing process can be resumed. Automatic recording can take place throughout the entire process.

The accuracy of this system is such that it complies completely with the metrological requirements for this type of equipment.

The zero setting of both Analogue/Digital converters (24, 28) is achieved automatically at regular intervals in time by the control unit 32.

ADVANTAGES

1. Through the use of the loadcells a fast reaction- and setting time is obtained due to the manner in which they are installed and the minimal deformation which they undergo.

2. Check weighing takes place automatically with each gross and tare recording of a batch, without intervention by the operator.

3. The check weighing takes no time in view of the fact that it is carried out during the equilibrium detection.

4. A warning will be given when a small (acceptable) error occurs and an immediate interruption of the weighing process takes place in the event that a too large (unacceptable) error is detected.

5. Little maintenance.

I claim:

1. Automatic weighing apparatus for weighing batches of material contained in a weighing hopper coupled to the apparatus, said apparatus being mountable on a support and interposed between the support and the weighing hopper so that a force generated by the material in the weighing hopper is applied to the apparatus along a direction extending between the support and the weighing hopper, said apparatus comprising:

a U-shaped frame having a pair of arms extending normal to the direction of force application;

primary load cell means operatively associated with one of said arms and providing a signal proportional to the force applied to said primary load cell means;

secondary load cell means operatively associated with another of said arms and providing a signal proportional to the force applied to said secondary load cell means;

means coupling said primary load cell means to the support;

means coupling said secondary load cell means to the weighing hopper;

the coupling of said primary and secondary load cells means to the support and weighing hopper, respectively, being such that a same force is simultaneously applied to each of said load cell means by the material contained in the weighing hopper; and comparator means coupled to said primary and secondary load cells means for comparing the signal from said primary load cell means with the signal from said secondary load cell means to check a correctness of the signal provided by said primary load cell means.

2. Apparatus as claimed in claim 1 wherein said primary and secondary load cell means comprise a plurality of primary and secondary load cells, respectively.

3. Apparatus as claimed in claim 1 wherein said apparatus is interposed between the support and the weighing hopper so that the force generated by the material in the weighing hopper is applied in a vertical direction extending between the support and the weighing hopper, wherein said U-shaped frame has vertically spaced horizontal arms and wherein said primary load cell means is operatively associated with the upper arm of said frame and said secondary load cell means is operatively associated with the lower arm of said frame.

4. Apparatus as claimed in claim 1 wherein said spaced arms have outer ends, said outer ends being coupled together by connecting means.

5. Apparatus as claimed in claim 1 wherein said means coupling said primary load cell means to the support is further defined as comprising a pair of tie rods, each having first and second ends, the first end of each of the tie rods being connected to said primary load cell means, the second ends of said tie rods being joined by a connection plate, and a ball and socket arrangement being interposed between said connection plate and the support.

6. Apparatus as claimed in claim 1 wherein said means coupling said secondary load cell means to the weighing hopper comprises a pair of tie rods, each having first and second ends, the first end of each of said tie rods being connected to said secondary load cell means, the second end of each of said tie rods being connected to a connection means suitable for coupling to the weighing hopper.

7. Apparatus as claimed in claim 5, wherein said means coupling said secondary load cell means to said weighing hopper comprises a further pair of tie rods, each having first and second ends, the first end of each of said tie rods being connected to said secondary load cell means, the second end of each of said tie rods being connected to a connection means suitable for coupling to the weighing hopper.

8. Apparatus as claimed in claim 1 further including control means for indicating the weight of the batch of material in the weighing hopper.

9. Apparatus as claimed in claim 1 further including an analog/digital converter interposed between each of said primary and secondary load cell means and said comparator means.

10. Apparatus as claimed in claim 1 wherein said primary load cell means and secondary load cell means are further defined as being matched to one another with respect to thermal operating characteristics.

11. Apparatus as claimed in claim 9 wherein said digital/analog converters incorporate an adjustable input filter for equalizing the properties of said converters.

* * * * *